United States Patent [19]
Snider

[11] 3,788,603
[45] Jan. 29, 1974

[54] ROTARY FLOW CONTROL VALVE FOR AIR OPERATED TOOLS AND THE LIKE

[75] Inventor: Philip A. Snider, Hicksville, Ohio
[73] Assignee: Dotco, Inc., Hicksville, Ohio
[22] Filed: Apr. 16, 1971
[21] Appl. No.: 134,766

[52] U.S. Cl. .............................. 251/345, 137/560
[51] Int. Cl. ............................................. F16k 3/26
[58] Field of Search .......... 251/304, 343, 344, 345; 415/152, 503; 137/594, 596, 560, 625.18; 418/266

[56] References Cited
UNITED STATES PATENTS
| | | | |
|---|---|---|---|
| 633,355 | 9/1899 | Boyer | 251/304 |
| 3,423,068 | 1/1969 | Hall | 415/503 X |
| 3,439,422 | 4/1969 | Doeden et al. | 415/152 |

Primary Examiner—William R. Cline
Attorney, Agent, or Firm—Donnelly, Maky, Renner & Otto

[57] ABSTRACT

A small air driven tool and an air valve particularly suitable therefor. The valve has a valve body which is cylindrical. Two aligned inlet passages extend axially from opposite ends of the body but stop short of each other. Spaced apart openings communicate the passages with the outside diameter of the valve body. A valve sleeve is rotatable around the valve body and has sealing means on the inside thereof to seal the openings from each other, or alternatively to expose the openings to each other. A characteristic of the valve is that it is compact having a large flow capacity with relation to its size.

Preferably, the valve is provided with an exhaust passage extending longitudinally through the valve body offset from the inlet passages.

5 Claims, 5 Drawing Figures

PATENTED JAN 29 1974
3,788,603
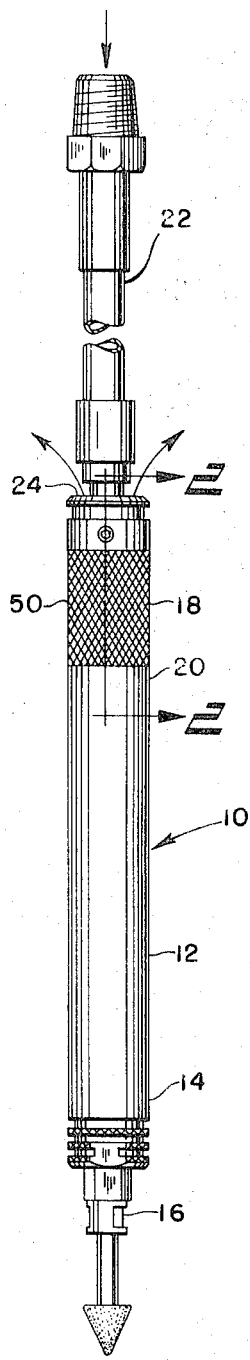
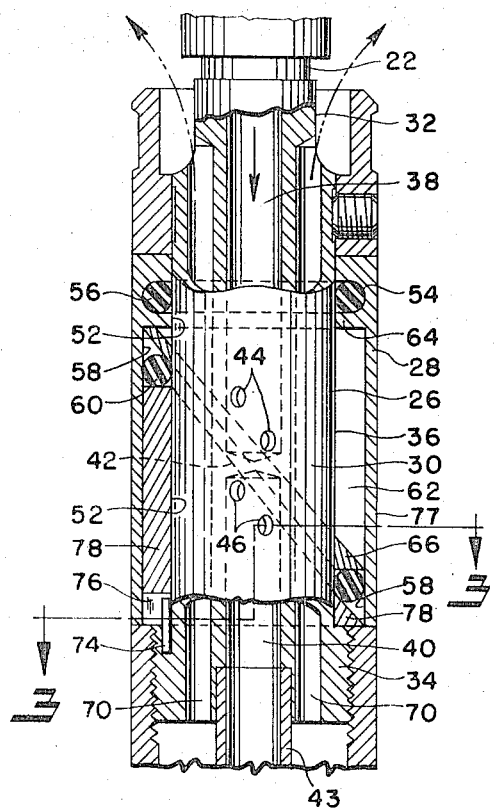
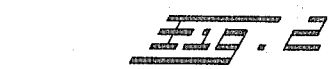
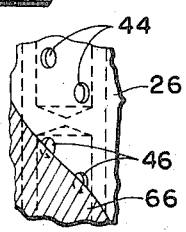
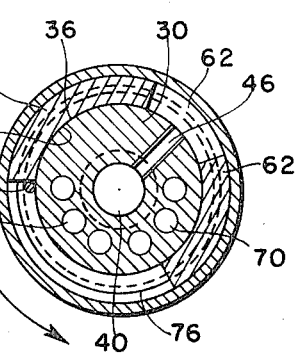
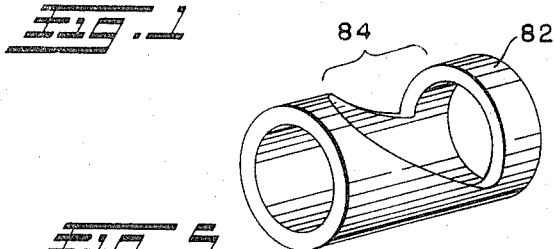
INVENTOR.
PHILIP A. SNIDER
BY
Oberlin, Maky, Donnelly & Renner
ATTORNEYS

ROTARY FLOW CONTROL VALVE FOR AIR OPERATED TOOLS AND THE LIKE

BACKGROUND OF THE INVENTION

This invention relates to air driven tools, and more particularly to an air valve for such tools.

The invention is particularly suitable for small high speed air motors and the control of air input into the motors, and will be described with reference thereto, although it will be apparent that the invention has other applications.

Prior U.S. Pat. No. 3,439,422, to Roland E. Doeden and Richard E. Noonan, describes an air driven tool of the type with which the present invention is concerned. This tool is especially suited for dental purposes and has a high speed compact motor capable of providing a high torque with low air pressures. In the patent, the inlet air and exhaust air are introduced into and exhausted from the air motor by passages located in the rear part of the tool. Because of the low pressure of the intake air, these passages and whatever valving means is employed must be capable of handling a relatively large volume of air.

SUMMARY OF THE INVENTION

It is a principal object of the present invention to provide an improved valving means suitable for small, high speed air motors, and in particular one which is compact in the sense that it has a relatively high flow capacity with relation to its size.

It is further an object of the present invention to provide a compact valve for small, high capacity, air motors which is inherently easy to operate and set at a position between fully closed and fully opened.

It is another object of the present invention to provide a small, compact, air control valve for air tools which is simple in construction, having only one moving part.

It is still further an object of the present invention to provide an air control valve for air driven tools in which the valve parts are completely sealed in all positions of the valve against the flow of dirt into the valve.

A still further object of the present invention is to provide a single valve means which is compact and simple in construction, and at the same time has passages to accommodate the flow of exhaust air in addition to intake air.

These and other objects of the present invention will become apparent as the following description proceeds.

To the accomplishement of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

BRIEF DESCRIPTION OF THE DRAWING

In the annexed drawing:

FIG. 1 is a side elevation view of an air operated tool constructed in accordance with the present invention;

FIG. 2 is an enlarged fragmentary section view of the portion of the tool of FIG. 1 taken along the plane of the line 2—2 thereof;

FIG. 3 is a cross-section view taken along line 3—3 of FIG. 2;

FIG. 4 is a partial, elevation, section view of the air operated tool of FIG. 1 schematically illustrating concepts of the present invention; and FIG. 5 is a perspective view illustrating an embodiment in accordance with the present invention.

DESCRIPTION OF THE PREFERRED EMBODIMENT

Referring now in detail to the drawing, and in particular to FIG. 1, there is shown an air operated tool 10 having a generally narrow, cylindrical, elongated housing 12. The housing contains an air motor of the type shown in prior U.S. Pat. No. 3,349,422, and has a collet end 14 from which a collet 16 projects, attached to the front end of the air motor within the housing. An air intake and exhaust assembly 18 is threaded into the rear end 20 of the housing, and an air supply conduit 22 is connected to the air intake and exhaust assembly.

As shown in FIG. 1, exhaust air exits from the air intake and exhaust assembly at 24 around the air supply conduit 22. If desired, an overhose (not shown) can be employed around the air supply conduit to transmit the exhaust air away from the air operated tool.

Details of the air intake and exhaust assembly 18, the subject of the present invention, are shown in FIG. 2. The assembly functions as an air intake valve and exhaust air conduit, and essentially is comprised of two pieces, an inner valve body 26 and an outer valve sleeve 28.

The valve body 26 is circular in cross section, having a generally elongated, intermediate section 30. It has a constricted neck portion 32 at the rearmost end, and an enlarged diameter threaded portion 34 at the opposite front end. The intermediate section 30 is provided with a machined, smooth, cylindrical, outer surface 36.

The valve body 26 is a relatively solid block-line member as shown in FIG. 3. Two axially extending passages 38 and 40 are bored inwardly from opposite ends into the body. The first passage 38 extends through the neck 32, the other passage 40 extending through the threaded portion 34. The two passages are aligned with each other and with the axis of the body, but stop short of each other so that they are separated by a small land 42.

At the threaded end 34, the bore for passage 40 is slightly enlarged in diameter to provide a seat for a coupling 43. This coupling transmits intake air to the motor in a manner described in copending U.S. Pat. application Ser. No. 134,588, filed Apr. 16, 1971, now U.S. Pat. No. 3,719,440, by Philip A. Snider, and assigned to assignee of the present application.

Radially oriented pairs of spaced openings 44 and 46 extend from the outer surface 36 of the valve body to the passages 38 and 40 communicating the respective passages with the outside of the valve body. The openings are positioned relatively close to the land 42, but lie in planes which are oblique with respect to the axis of the valve body. The pair of openings 44 which communicate with the passage 38 lie in one oblique plane, the pair of openings 46 communicating with passage 40 being in a second oblique plane parallel but spaced from the plane for openings 44.

The valve sleeve 28 is a cylindrical hollow member which is dimensioned to embrace at least part of the valve body in the area of the radial openings, and is coaxial with the valve body. The outer surface 50 of the sleeve (FIG. 1) is knurled so that it can be rotated easily with respect to the valve housing 12. The inner surface 52 of the sleeve has an inside diameter such that it makes a close sliding fit with the machined outer surface 36 of the valve body.

The inner surface of the sleeve is recessed and grooved at a number of places. Annular groove 54 on the inside of the sleeve, at the end of the sleeve closest to the neck 32, extends in a plane perpendicular to the axis of the valve body. This groove accommodates circular O-ring 56. A second obliquely extending groove 58 also traverses the inner circumference of the sleeve, but lies in a plane which makes an angle with the axis of the sleeve approximately parallel with the planes in which openings 44 and 46 lie. It extends from a point close to the annular groove 54 to a point close to the opposite end of the sleeve. This groove accommodates O-ring 60.

Between the annular groove 54 and the oblique groove 58, the inner surface of the sleeve 28 is recessed to provide a semi-circular chamber 62, one end of which is established by inner land portion 64 retaining O-ring 56, and at the opposite end by land 66 retaining O-ring 60.

The flow of intake air into and through the valve is from air supply conduit 22 via passage 38, openings 44, the second pair of openings 46 and into passage 40. The latter is in communication with the air motor for the tool. This flow of air is established, or interrupted simply by turning valve sleeve 28 around the valve body.

In the position shown in FIG. 2, the pairs of openings 44 and 46 in the valve body are isolated and sealed from each other by land 66 of the sleeve and O-ring 60 and there is no flow of intake air through the valve. If the sleeve is rotated slight to the left, to the position shown in FIG. 4, at least portions of the openings 46 are exposed so that they are in flow communication with the openings 44, establishing a flow of intake air through the valve air chamber 62 between the openings. Further rotation of the sleeve to the left fully exposes the pairs of openings to each other increasing the flow of intake air.

In operation, the close fit between the inside surface 52 of the sleeve and the outside surface of the valve body along land 66 operates as the primary means to constrict the flow of intake air, the O-ring 60 providing primarily a sealing action to prevent escape of high pressure air from the chamber 62. This O-ring and O-ring 56, which also seals chamber 62, also prevent the ingress of dirt or other foreign material into the valve.

Preferably, exhaust air is transmitted through the valve body to the rear of the air tool. This is accomplished by a plurality of exhaust passages 70 which extend longitudinally through the valve body. These passages are arranged in a semi-circular array or pattern, shown in FIG. 3, offset from the axially extending intake passages 38, 40. In the embodiment illustrated, six exhaust passages are provided. Their cross-sectional areas combined are sufficient to accommodate the expanded low pressure air exhausted from the air motor of the tool.

By arranging the exhaust passages in a semi-circular array in the valve body, interference with the radial openings 44, 46 for the intake air is avoided, preventing the problem of leakage of intake air to the exhaust passages.

A dowel 74, FIG. 2 is seated in the valve body threaded portion 34 extending longitudinally along side machined surface 36 of the valve body. A recess 76 is machined or formed in the forward end of the sleeve 28. This recess has a depth to accommodate dowel 74 and a limited arc length so that the rotational movement of the sleeve is between fully opened and fully closed positions.

The valve sleeve 28 can be manufactured in a number of ways. In FIG. 2, the obliquely extending groove 58 and recess 62 are formed by the use of separate cylindrical inserts or pieces press fit into an outer cylindrical piece. The latter is member 77 machined to the depth of the recess 62 up to land 64. Land 66 is a cylindrical piece obliquely cut at both ends and press fit held in member 77 at the position where one end abuts land 64. The second inner piece 78 is obliquely cut at one end only, and is cut in a plane at right angles to the axis of the piece at the opposite end. It is press fit held in member 77 at the position where the obliquely cut end thereof is slightly spaced from land 66 to define groove 58. Recess 76 is cut into the opposite end.

Alternatively the sleeve can be manufactured by casting, forming or machining the inner surface of a cylindrical tubular member to provide the grooves 54, 58 and recesses 62, 76.

As a further alternative, the sleeve can be constructed of multiple parts, comprising an inner tubular part 82 (FIG. 5) which is dimensioned to fit snugly within an outer tubular part (not shown). The inner part is cut away to define the recess or chamber area 84 having the shape illustrated in FIG. 5. It is made of molded rubber so as to provide a one piece seal construction. The outer part is a plain cylindrical piece.

Other modifications within the scope of the invention are possible. For instance, a larger number of radial openings for the intake air communicating the separated axially extending passages with each other can be provided. Also, these openings can be arranged in a different pattern, and a different configuration for the inner sealing surface of the outer sleeve can be provided.

Advantages of the invention should be apparent. For one, the valve is simple, having only one moving part. It is extremely compact in the sense that it has a high flow capacity relative to its size. Since the valve body is embraced by the valve sleeve, the latter moving rotationally around the valve body, the ingress of dirt into the valve is avoided. The valve also has the advantage that it is able to accommodate both intake air and exhaust air in independent passages without increase in valve size. Finally, the valve is inherently easy to operate and set, and can be easily and reliably set at all positions including closed, fully open, and positions between closed and fully opened.

I, therefore, particularly point out and distinctly claim as my invention:

1. An air operated tool and valve therefor, the valve comprising a valve body having a peripheral groove including a cylindrical bottom wall and axially spaced apart end walls, and having first and second passages extending from opposite ends of said body but stopping short of each other, each passage having at least one opening through said bottom wall; and a sleeve disposed in said groove and axially retained between said end walls and having a rotary sealed engagement with said bottom wall; said sleeve having an internal recess therein with which the opening of said first passage is communicated in different rotary positions of said sleeve, said recess having an oblique end wall which in one rotary position of said sleeve covers the opening of said second passage to block communication between said first and second passages and which in another rotary position of said sleeve uncovers the opening of said second passage for communicating said first and second passages with each other via said openings and said recess.

2. The tool of claim 1 wherein said sleeve has a packing ring adjacent the other end wall of said recess in rotary sealed engagement with said bottom wall, and an obliquely disposed packing ring adjacent said oblique end wall of said recess in rotary sealed engagement with said bottom wall.

3. The tool of claim 2 wherein said packing rings are disposed in internal grooves in said sleeve.

4. The tool of claim 3 wherein said internal groove for said obliquely disposed packing ring is defined by an obliquely disposed ring member which is disposed in a bore in said sleeve and which forms the oblique end wall of said recess, and by a tubular member in said bore having an oblique end wall axially spaced from said ring member.

5. The tool of claim 1 wherein said sleeve has in a bore thereof a tubular member of rubber-like material which is in rotary sealed engagement with said bottom wall and which has a cut out portion which defines said recess with said sleeve bore and which forms said oblique end wall.

* * * * *